United States Patent [19]

Mukai

[11] Patent Number: 5,058,093
[45] Date of Patent: Oct. 15, 1991

[54] SIGNAL LEVEL DEVIATION DETECTING APPARATUS

[75] Inventor: Toshiharu Mukai, Sennan, Japan

[73] Assignee: Matsushita Electric Industrial Co., Ltd., Osaka, Japan

[21] Appl. No.: 453,085

[22] Filed: Dec. 21, 1989

Related U.S. Application Data

[63] Continuation-in-part of Ser. No. 7,114, Jan. 27, 1987, abandoned.

[30] Foreign Application Priority Data

Jan. 27, 1986 [JP] Japan ................................. 61-15123
Aug. 19, 1986 [JP] Japan ................................. 61-193226

[51] Int. Cl.$^5$ .............................................. G11B 7/00
[52] U.S. Cl. .......................................... 369/58; 369/59
[58] Field of Search ..................................... 369/58, 59

[56] References Cited

U.S. PATENT DOCUMENTS

| | | | |
|---|---|---|---|
| 3,900,890 | 8/1975 | Eibner | 360/25 |
| 4,006,295 | 2/1977 | Oprandi et al. | 369/124 |
| 4,308,612 | 12/1981 | Miyauchi et al. | 369/58 |
| 4,685,098 | 8/1987 | Yoshida | 369/54 |
| 4,691,308 | 9/1987 | Takagi et al. | 369/54 |
| 4,719,612 | 1/1988 | Kenjyo | 369/58 |

Primary Examiner—Vincent P. Canney
Attorney, Agent, or Firm—Wenderoth, Lind & Ponack

[57] ABSTRACT

A signal level deviation detecting apparatus for detecting an amplitude deviation of an alternating signal is disclosed. This apparatus comprises: at least two waveform shaping circuit shaving different threshold values for converting an input alternating signal into at least two rectangular waveform signals; a pulse conversion circuit for converting the rectangular waveform signals into at least two pulse signals logic states which change in a first specific circulation pattern when the input alternating signal maintains its normal amplitude, wherein the pulse conversion circuit is adapted to cause a change from the first specific circulation pattern to a second specific circulation pattern when the amplitude of the input alternating signal is deviated to such an extent that one of the rectangular waveform signals disappears; and a state transition discrimination circuit which receives the at least two pulse signals and inverts its output logic state in response to a change between first and second specific circulation patterns to thereby produce a signal level deviation detected signal indicative of the amplitude deviation of the input alternating signal.

10 Claims, 11 Drawing Sheets

→ TIME

SIGNAL LEVEL DEVIATION DETECTING APPARATUS

This application is a continuation-in-part of now abandoned application, Ser. No. 07/007,114 filed on Jan. 27, 1987.

BACKGROUND OF THE INVENTION

1. Field of the Invention

This invention relates to an apparatus for detecting a level deviation or defect of a signal such as a reproduced signal read out of an information recording medium.

2. Description of the Prior Art

A variety of types of apparatus have been developed lately for recording video or audio information on an optical disk and then reproducing the information. They have a contact-free reproduction ability and ,a high density recording capability. Signals are recorded at high density in the recording layer of the optical disk. The recording layer is protected from damage due to oxidation or mechanical shock by using a protecting layer of a light-transmitting resin material or the like. The reproducing head is indispensably controlled by a servo mechanism for focusing and tracking.

A disk having a resin protecting layer could be easily scratched or injured on its surface, causing a flow, if it is not handled carefully. Such a flaw of the disk is fatal to the entire system. For example, the servo mechanism of the reproducing head could kick off to an adjacent track due to disturbance by the flaw, or the error the reproduction head in the demodulation circuit caused by the flaw would propagate even after the head has passed through the flaw portion. To lessen these adverse effects due to the flaw, it is desireable to detect the flaw in real time and correct the disturbance of the reproduced signal.

Incidentally, in the servo mechanism, since the supply voltage is limited, the vibration resistant performance is limited. Therefore, due to an unexpected outside impact the reproducing head would be kicked off its desired track to an adjacent information track. As a countermeasure, it is necessary to detect the off-track state of the reproducing head, and return it to the original reproducing position as quickly as possible.

Referring now to the drawings, one of the conventional signal level deviation detecting apparatus will be described below.

Figure 11:
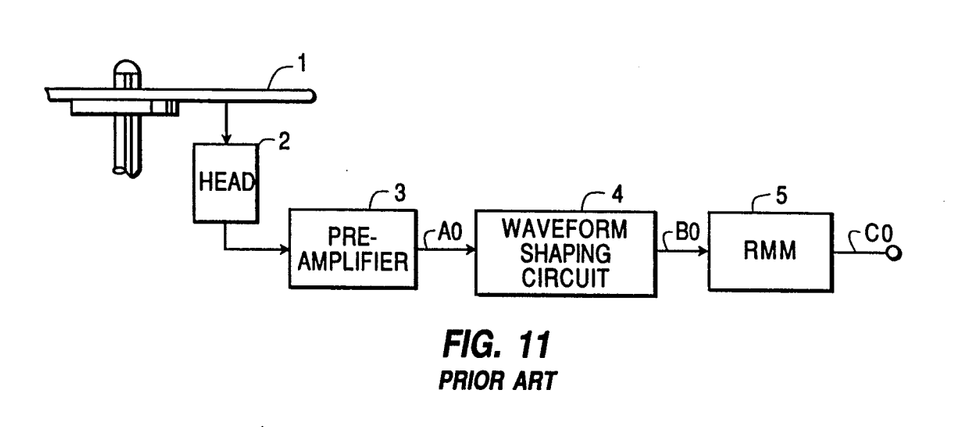
FIG. 11 is a block diagram of one of conventional signal level deviation detecting apparatus; and FIG. (a) through FIG. 12 (c) are signal waveform diagrams at various parts in the block diagram of FIG. 11.
Figure 12A:
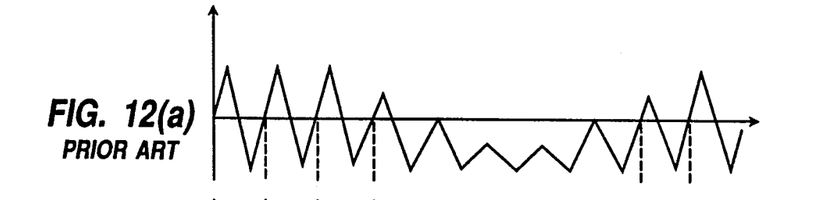
Figure 12B:
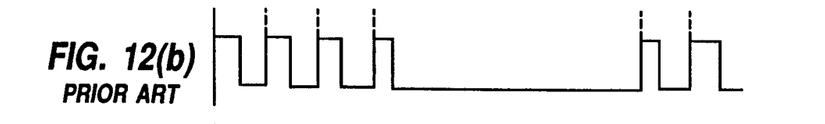
Figure 12C:
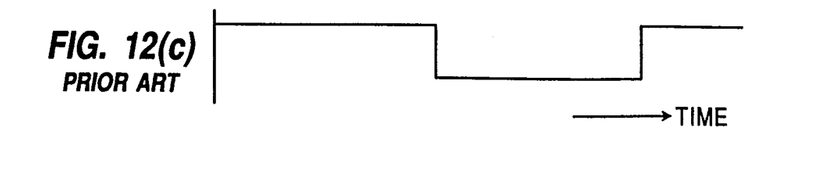

FIG. 11 is a block diagram of a conventional signal level deviation detecting apparatus. FIGS. 12 (a)-(c) show the respective signal wave forms of A0, B0 and C0 in FIG. 11. The reproduced signal A0 is actually a sinusoidal wave, but is schematically represented as a triangular wave.

The reproduced signal A0 read out from an information recording medium 1 (hereinafter referred to as disk 1) is converted into a rectangular wave B0 by a waveform shaping circuit 4. It must be noted here that the signal recorded in the disk 1 is generally limited in the frequency band, so that the longest period of the reproduced signal A0 is controlled at a constant value. For example, in the EFM method used in a CD player, if the fundamental clock period is assumed to be 1T, the longest period is 11T.

However, if there is a flaw in the disk 1, the information recording layer of the disk 1 is concealed by this flaw, and the reproduced signal A0 will not be obtained correctly. Accordingly, the period of the rectangular wave B0 exceeds the longest period in the section of the flaw. Therefore, if the rectangular wave B0 is fed into a retriggerable monostable multivibrator 5 (RMM 5), which has an output pulse width slightly longer than the longest period, the logic of output signal C0 of RMM 5 is inverted in the section of the flaw. Thus, the section having the flaw in the disk 1 can be detected by making use of the phenomenon that the deviation of the period of the reproduced signal exceeds a specified width.

In such a constitution, however, the rotational period of the disk 1 is required to be nearly in coincidence with the rotational period at the time of recording. That is, since the longest period of the reproduced signal is in linear proportion to the rotational period of the disk 1, and if the rotational speed of the disk 1 is low, the longest period of the reproduced signal is longer than the specified value. This tendency is, particularly when the disk 1 starts rotating. Therefore, it is required that the output pulse width of RMM 5 be sufficiently long in order to avoid malfunction when the rotational speed of the disk 1 is low. As a result, after the disk 1 has reached the normal rotational speed, the detection of deviation of the reproduced signal A0 is delayed by a time corresponding to the extra portion of the pulse width. Further, the method of determining the output pulse width generally makes use of the time constant of charge and discharge determined by a capacitor and a resistor. Therefore, the circuit, if integrated on an IC chip, requires an external capacitor, so that it is disadvantageous for reducing cost or size. Even if function equivalent to the time constant is realized by using a binary counter, correct counting is difficult unless the clock for counting is synchronized in phase with the reproduced signal.

SUMMARY OF THE INVENTION

In the light of the above-discussed problems, it is a primary object of this invention to present a signal level deviation detecting apparatus which is inexpensive, small-sized, and stable in operation regardless of the rotational speed of the disk.

A signal level deviation detecting apparatus of this invention comprises: at least two waveform shaping means having different threshold values for converting an input alternating signal into at least two rectangular waveform signals; a pulse conversion means for converting said rectangular waveform signals into at least two pulse signal logic states which have a specific relationship which changes in a first specific circulation pattern when said input alternating signal maintains its normal amplitude, said pulse conversion means being adapted to cause a change of said first specific circulation pattern to a second specific circulation pattern when the amplitude of said input alternating signal is deviated to such an extent that one of said rectangular waveform signals disappears; and a state transition discrimination means which receives said at least two pulse signals and inverts its output logic state in response to a change between said first and second specific circulation patterns thereby to produce a signal level deviation detected signal indicative of the amplitude deviation of said input alternating signal.

Since a state transition between the two kinds of pulse signals, generated from the input signal is discriminated, the operation does not depend on the period of reproduced signal, so that the deviation of the input signal can be always detected even if the rotational speed of the disk is slow.

BRIEF DESCRIPTION OF THE DRAWINGS

FIG. 2 (a) through FIG. 2 (f) are signal waveform diagrams at various parts in the block diagram of FIG. 1;

FIG. 5 (a) through FIG. 5 (i) are signal waveform diagrams at various parts in each of the block diagrams of FIG. 3 and FIG. 4;

FIG. 8 (a) through FIG. 8 (i) are signal waveform diagrams at various parts in each of the block diagrams of FIG. 6 and FIG. 7;

FIG. 10 (a) through FIG. 10 (k) are signal waveform diagrams at various parts in the block diagram of FIG. 9.

DESCRIPTION OF THE PREFERRED EMBODIMENTS

Figure 1:
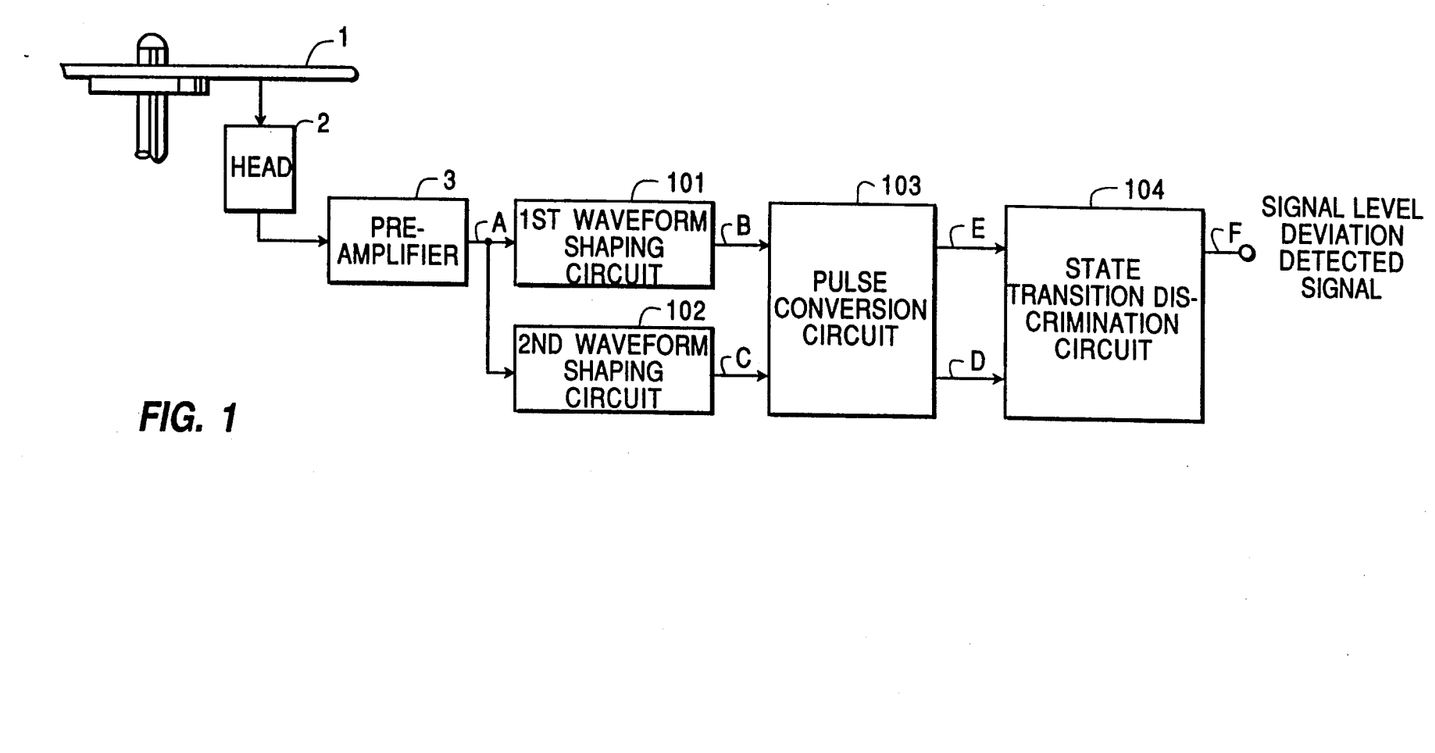
FIG. 1 is a block diagram of a signal level deviation detecting apparatus according to a first embodiment of this invention.

FIG. 1 is a block diagram showing a first embodiment of a signal level deviation detecting apparatus of this invention. Information recorded on an optical disk 1 is reproduced by an optical head 2. An amplifier 3 converts a photo current output of the head 2 to an amplified voltage signal which is a reproduced signal First and second waveform shaping circuits, 101 and 102 convert the reproduced signal into two rectangular wave signals at different threshold values. A pulse conversion circuit 103 converts the outputs from the first and second waveform shaping circuits 101 and 102 into two pulse trains partly overlapped on each other on a time axis. Numeral 104 is a state transition discrimination circuit.

Figures 2A, 2F:
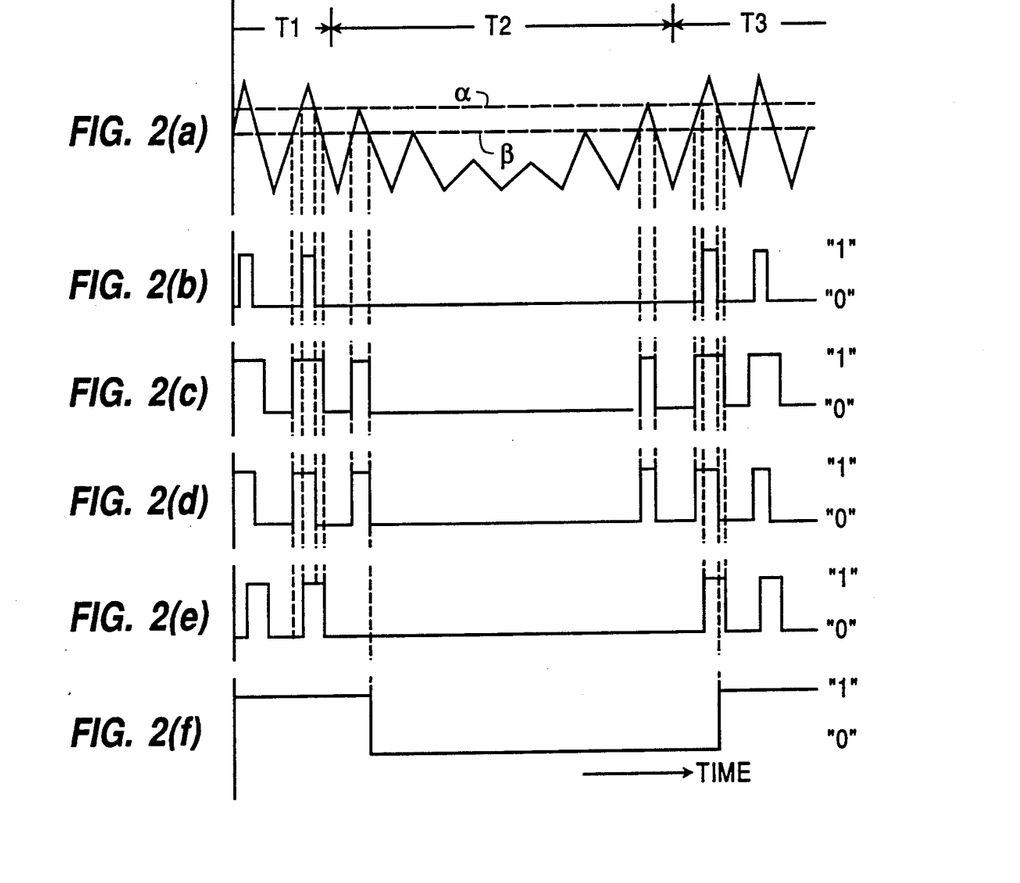

The signal waveform diagrams shown in FIG. 2 (a) through FIG. 2 (f) respectively correspond to signals A, B, C, D, E and F in FIG. 1. Here the reproduced signal A read out from the disk 1 has actually a nearly sinusoidal waveform, but it is schematically expressed as a triangular wave.

Described below is an example where a light beam of the head 2 is interrupted due to a contamination on the surface of the disk 1. FIG. 2 (a) shows a reproduced signal A in such a case. As stated before, the information layer of the disk 1 is protected with a protecting layer which usually has a thickness of about 1 mm.

Since the light beam is focused on the information layer, the surface of the disk 1 is in a defocused state due to the thickness of the protecting layer. Therefore, if the light beam is interrupted by the contamination on the disk 1, the light beam returning to the head 2 is not momentarily concealed, but instead the quantity of light returning to the head 2 gradually decreases. Accordingly, the amplitude of the reproduced signal A read out from the disk 1 reduces slowly. Further, since the mean of the reproduced sinal A is proportional to the quantity of light received by the head 2, the center level of the reproduced signal A drops at the same time. That is, the reproduced signal A when the disk is contaminated becomes as shown in FIG. 2 (a), in which times $T_1$ times $T_3$ refer to sections in which the waveform of the reproduced signal is in a normal state, and $T_2$ indicates a section in which the waveform of the reproduced signal is reduced.

In FIG. 2 (a), the broken line $\alpha$ indicates a threshold of the first waveform shaping circuit 101, and a broken line $\beta$ denotes a threshold of the second waveform shaping circuit 102. The threshold of the first waveforms shaping circuit 101 is higher than that of the second waveform shaping circuit 102. The output signal $\beta$ of the first waveform shaping circuit 101 and the output signal C of the second waveform shaping circuit 102 are therefore as shown in FIG. 2 (b) and FIG. 2 (c), respectively The signals B and C, are pulse signals changing between signals a high level defined as logic "0" and a high level defined as logic "1". When the logic states of the two B and C expressed as (logic state of B logic state of C), the following transition of the logic state of the two signals B and C is repeated in sections $T_1$ and $T_3$.

$$(0, 0) \rightleftarrows (0, 1) \rightleftarrows (1, 1) \tag{1}$$

In section $T_2$ (where the disk 1 is contaminated), the transition of the logic state of the two signals B and C becomes as follows.

$$(0, 0) \rightleftarrows (0, 1) \tag{2}$$

The signals B and C are supplied to the pulse conversion circuit 103, where they are converted into signals E and D partly overlapped on each other as shown in FIG. 2(d) and FIG. 2 (e), respectively. The relation between the set of signals E and D and the set of signals B and C will be described in detail later with reference to FIG. 3 and FIGS. 5(b)–5(e). As a result, when the logical state of the output signals E and D of the pulse conversion circuits 103 is expressed as (logic state of E, logic state of D), the state transition of the logic state of the signals E and D repeats the circulation pattern of $$\boxed{\longrightarrow (0, 0) \longrightarrow (0, 1) \longrightarrow (1, 1) \longrightarrow (1, 0) \longrightarrow} \tag{3}$$

in sections $T_1$ and $T_3$, and the circulation pattern of $$(0, 0) \rightleftarrows (0, 1) \tag{4}$$

in section $T_2$. Therefore, by detecting the transition as returning from (0, 1) to (0, 0) in formula (4) by the state transition discrimination circuit 104, the level reduction of the reproduced signal can be detected as a signal level deviation detected signal.

Figure 3:
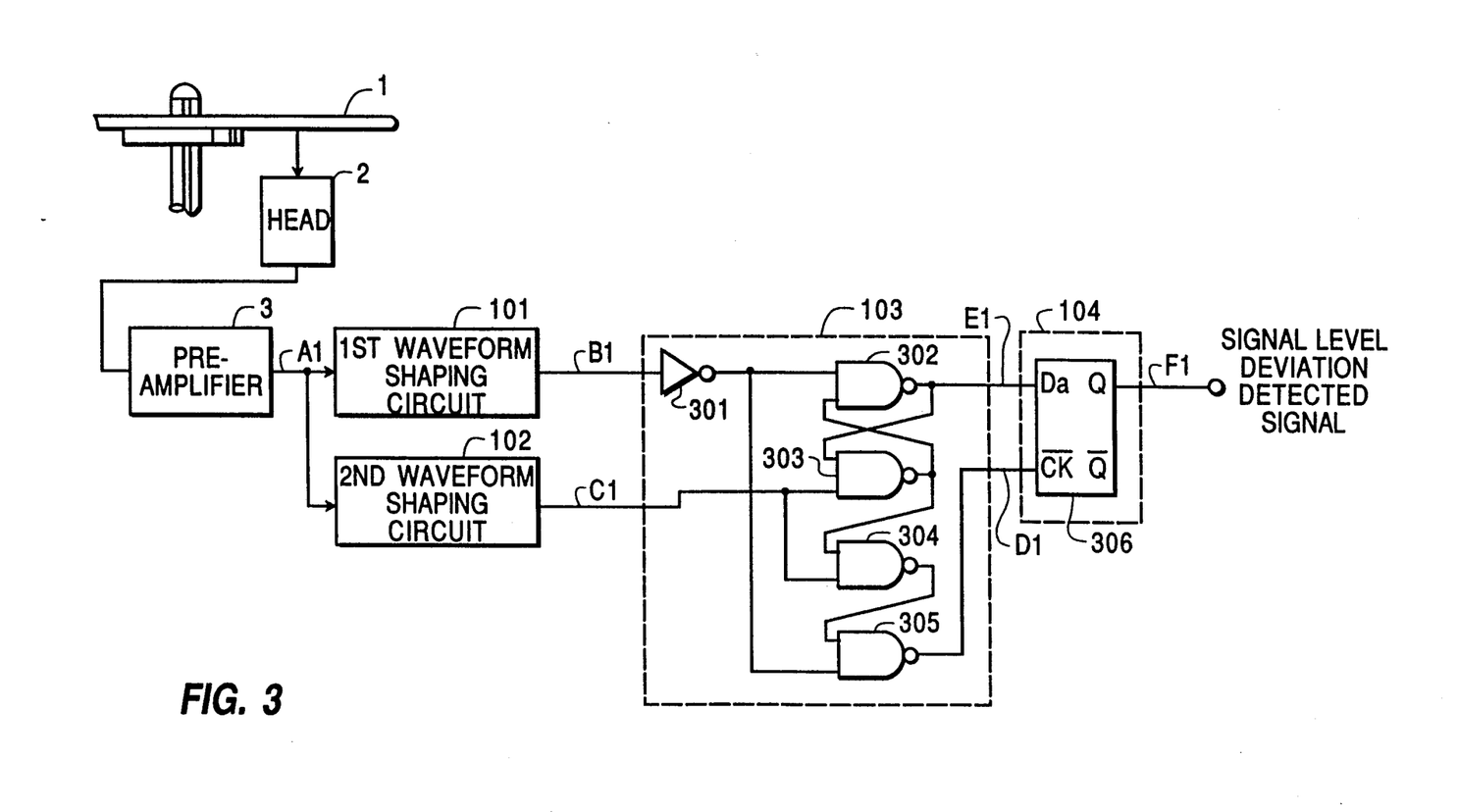
FIG. 3 is a block diagram showing a more detailed configuration of the signal level deviation detecting apparatus shown in FIG. 1.

FIG. 3 shows a more detailed configuration of the first embodiment shown in FIG. 1 in which a circuit composed of an inverter 301 and NAND gate circuits 302, 303, 304 and 305 is used as a pulse conversion circuit 103. The state transition discrimination circuit 104 is composed of an edge triggered D-flip-flop circuit 306. In FIG. 3, signals A1, B1, C1 D1, E1 and F1 correspond to the signal waveform diagrams shown in FIG. 5 (*a*) through FIG. 5 (*f*), respectively, and are respectively the same as signals A, B, C, D, E and F shown in FIG. 1.

The logic formulae of the output signals D1 and E1 of the pulse conversion circuit 103 shown in FIG. 3 are given as follows:

$$D1 = \overline{E1} \cdot C1 + B1 \tag{5}$$

$$E1 = E1' \cdot C1 + B1 \tag{6}$$

where E1' denotes a logic value of output E1 at a time one bit before, and $\overline{E1}$ represents the inverted logic of E1. According to formula (6), the signal E1 has, in sections $T_1$ and $T_3$, logic "1" during the period from a time the signal B1 rises to logic "1" to a time the signal C1 falls to logic "0", and in section $T_2$ it is always "0" because the signal B1 is always logic "0". Furthermore, the signal D1 has, in sections $T_1$ and $T_3$, logic "1" during a period from the time signal C1 rises to "1" to a time the signal B1 falls to "0"section $T_2$, D1 becomes the same logic as the signal C1 because the signal E1 is logic "0". Since the transitions of the input signals B1, C1 are as shown in formulae (1) and (2), the output signal of the NAND gate circuit 303 is the inverted state of the logic of the output signal E1. Therefore, the logic of $\overline{E1}$ can be obtained at the output of the NAND gate circuit 303.

Thus, by using the circuit configuration as shown in FIG. 3, the signals shown in FIG. 5 (*d*) and FIG. 5 (*e*), which overlap each other when the logic of the signal shown in FIG. 5 (*b*) is "1", can be obtained from the signals shown in FIG. 5 (*b*) and FIG. 5 (*c*).

Figure 5A:
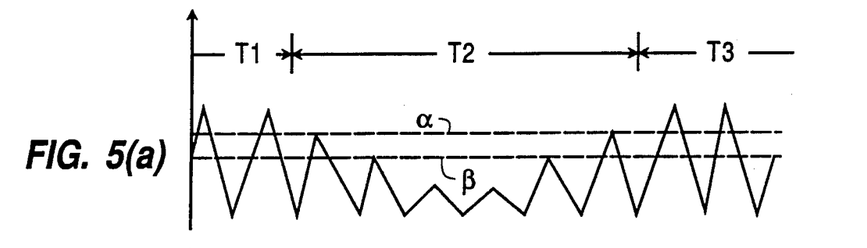
Figure 5B:
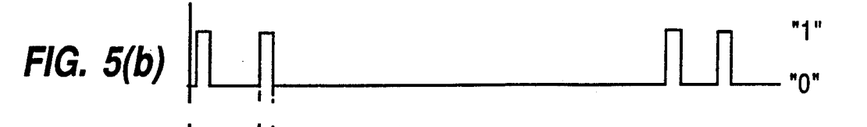
Figures 5C, 5D:
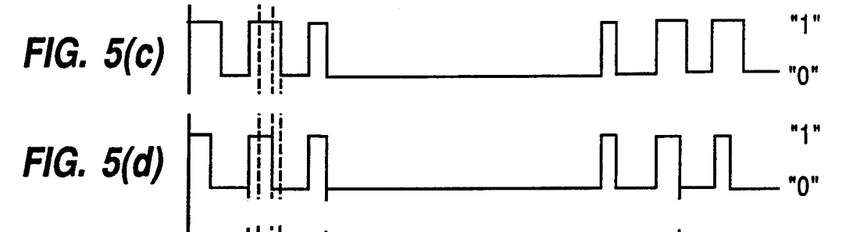
Figure 5E:
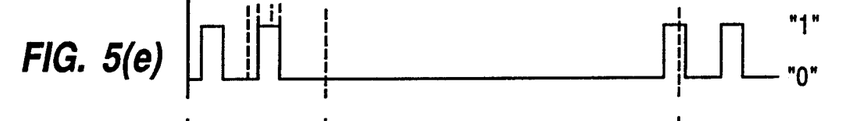
Figure 5F:
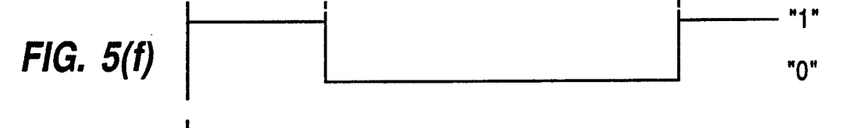
Figure 5G:
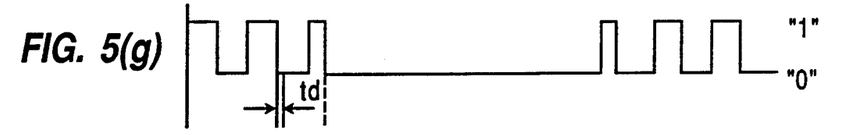
Figure 5H:
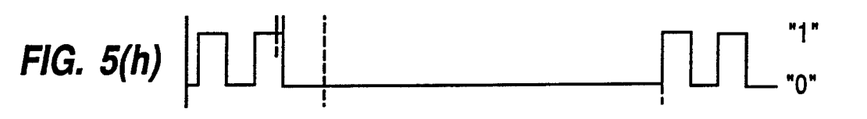

The output signals D1 and E1 of the pulse conversion circuit 103 obtained in this manner are supplied to the D-flip-flop 306 which makes up the state transition discrimination circuit 104. In the D-flip-flop 306, a logic value fed into an input terminal Da when a trailing edge is fed into a clock input terminal $\overline{CK}$ appears at an output terminal Q. Therefore, by feeding the signal D1 to the clock terminal $\overline{CK}$ of the D-flip-flop 306 and the signal E1 to the input terminal Da, the output signal F1, which is a signal level deviation detected signal, has logic "1" in sections $T_1$, $T_3$, and logic "0" in section $T_2$, as shown in FIG. 5 (*f*).

In this way, the pulse conversion circuit 103 and the state transition discrimination circuit 104 are adapted to operate in asynchronous logic. The only time element in generating the logic states is only the gate operation delay time the gate circuits, and the embodiment is affected by the period of the input signal A1. Therefore, if the rotation speed of disk 1 is slow, the level deviation of the reproduced signal due to a defective position of the disk can be detected reliably as a signal level deviation detected signal.

Figure 4:
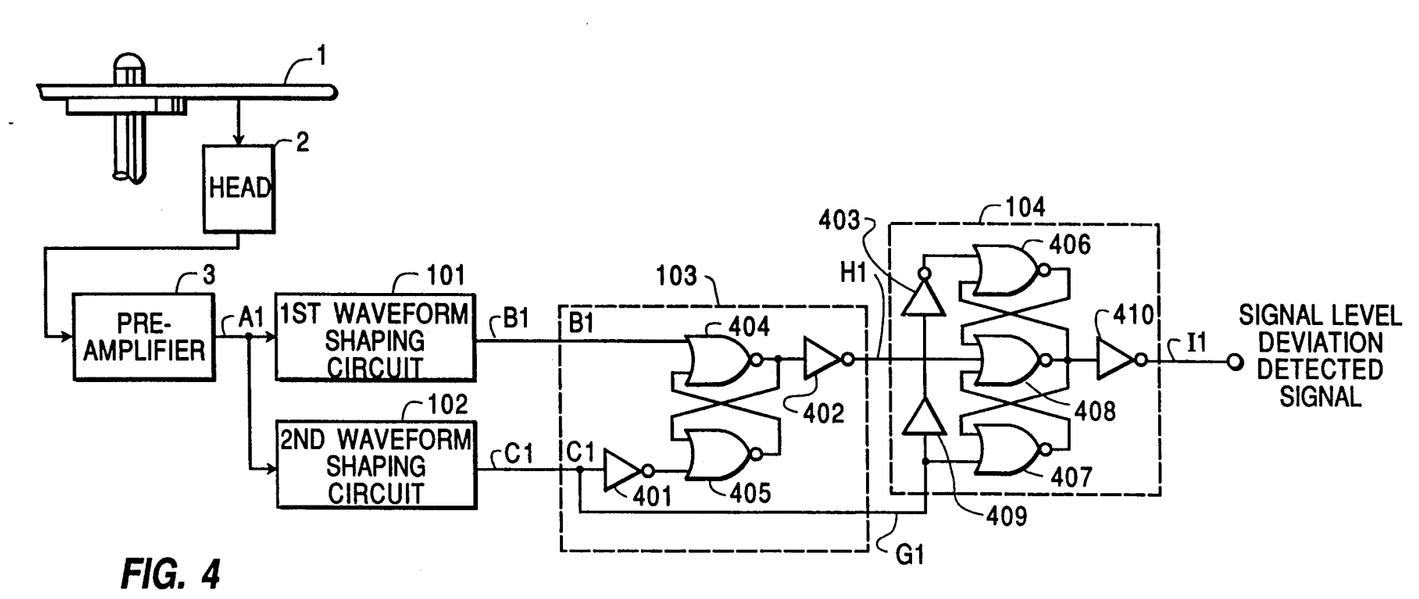
FIG. 4 is a block diagram of a signal level deviation detecting apparatus according to a second embodiment of this invention.

FIG. 4 shows a second embodiment of this invention, in which a circuit composed of inverters 401, 402, and NOR gate circuits 404, 405 is used as a pulse conversion circuit 103. A state transition discrimination circuit 104 is composed of an inverters 403, 410, a buffer 409, and NOR gate circuits 406, 407, 408. FIG. 5 (*a*) through FIG. 5 (*c*) and FIG. 5 (*g*) through FIG. 5 (*i*) are signal waveform diagrams of this embodiment, corresponding respectively to signals A1, B1, C1, G1, H1 and I1 in FIG. 4.

The logic formulae of output signals G1 and H1 of the thus composed pulse conversion circuit 103 are given as follows.

$$G1 = C1 \tag{7}$$

$$H1 = \overline{(\overline{C1} + \overline{H1'})} \cdot B1 \tag{8}$$

The logic formula of the output signal I1 of the state transition discrimination circuit 104 is given as follows.

$$I1 = \overline{\overline{G1} \cdot (\overline{H1} + I1') \cdot (H1 + I1')} \tag{9}$$

Where, H1' and I1' respectively, denote logic states of H1 and I1 at a time one bit before, and each bar shows an inverted logic state.

The NOR gate circuits 404, 405 constitute an RS-flip-flop, which has the same logic as the RS-flip-flop by NAND gate circuits 302, 303 in FIG. 3. (It is clear from the DeMorgan theorem.) In this way, the same signal waveform as shown in FIG. 2 (*e*) can be obtained as shown in FIG. 5 (*h*).

From the fall of the signal C1 to logic "0" to the fall of the signal H1 to logic "0", a gate delay td occurs due to the inverters 401, 402 and NOR gate circuit 405. Accordingly, is sections $T_1$, $T_3$, the logic "1" state is overlapped during the time of this gate delay td between the signals H1 and G1 (that is, FIG. 5 (*c*)). Therefore, the transition of (H1, G1) is the same as the state transition expressed by formula (3).

Figure 5I:
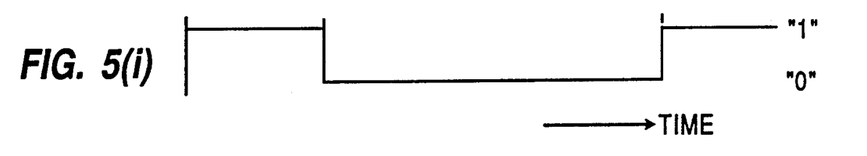

Furthermore, the buffer 409 in the state transition discrimination circuit 104 is a gate for delay. From formula (9), only when the signal G1 is logic "0" and the signal H1 is changed from logic "1", to logic "0", does the output signal I1 becomes logic "0" does not become logic "1" until the signal G1 becomes logic "1" again Accordingly, the output I1 of the state transition discrimination circuit 104, is as shown in FIG. 5 (*i*).

In this way, the pulse conversion circuit 103 and the state transition discrimination circuit 104 are built to operate in asynchronous logic. The only time element in generating the logic state is the gate delay time of the NOR gate circuit, buffer and inverter, and the embodiment not affected by the period of the reproduced signal A1. Therefore, the deviation of the reproduced signal due to a defective position of the disk 1 can be detected reliably as a signal level deviation detected signal, regardless of the rotational speed of the disk.

Next is illustrated a case of an off-track state of the optical head due to an unexpected external vibration or other disturbance.

Figure 6:
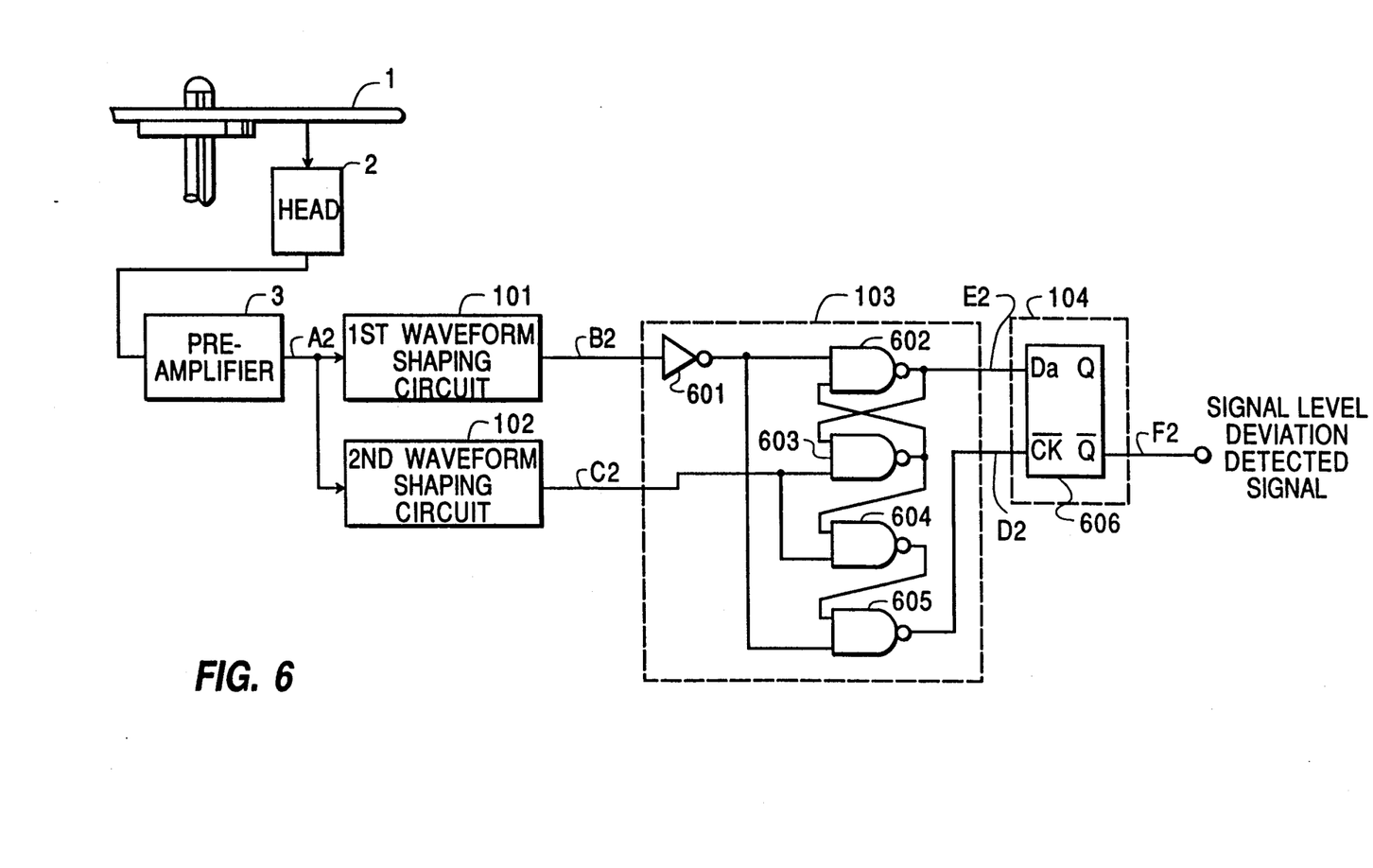
FIG. 6 is a block diagram of a signal level deviation detecting apparatus according to a third embodiment of this invention.

FIG. 6 is a block diagram of a third embodiment of a signal level deviation detection apparatus of this invention used in such a case. In FIG. 6, the disk 1, head 2, amplifier 3, first waveform shaping circuit 101, and second waveform shaping circuit 102 are the same as in the embodiment shown in FIG. 3, and are accordingly not specifically explained herein. A pulse conversion circuit 103 is composed of an inverter 601, and NAND gate circuits 602, 603, 604 and 605. The state transition discrimination circuit 104 is composed of an edge triggered D-flip-flop circuit 606.

The operation of the signal level deviation detecting apparatus shown in FIG. 6 will be described herein by referring ring through the signal waveform diagrams in FIG. 8 (a) to FIG. 8 (f) corresponding respectively, to signals A2, B2, C2, D2, E3 and F2 in FIG. 6.

Figure 8A:
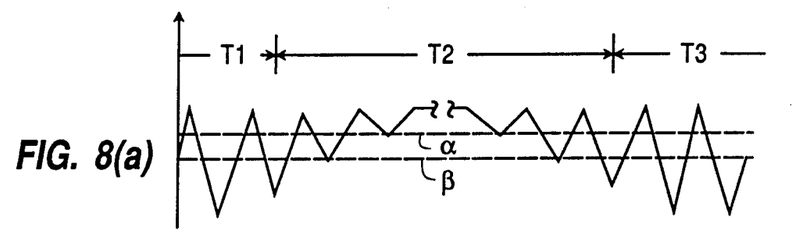

The reproduced signal A2 read out from the disk 1 is actually a sinusoidal waveform, but it is expressed as a triangular waveform for the sake of simplicity. In the signal waveform diagram of FIG. 8 (a), the upper side of the diagram is defined as a bright part, and the lower side as a dark part.

In an optical disk, generally, information tracks are formed by disposing undulations (so-called pits) on the mirror-smooth finished surface of the disk. By these pits on the information track, the light reflected from the disk produces diffracted lights of higher orders, and enters a photo detector (not shown) in the optical head 2, so that an interference occurs due to the phase difference of the diffracted lights. The intensity of an electric field caused by this interference is converted into a photo current by means of a photo diode or the like, whereby the head 2 reproduces the information on the disk 1. Therefore, when the head 2 is scanning the information track, the reproduced signal A2 is modulated by the pits on the information track, so that the mean quantity of received light is lowered. However, is the head 2 is off the track, it scans the pit-free mirror-smooth finished surface between tracks, so that the mean quantity of received light increases as compared to the case where the head 2 scans along the information track.

Meanwhile, the displacement of the head 2 acts as a secondary integrating element with respect to an acceleration disturbance such as vibration. Therefore, when the head 2 is off the information track, the reproduced signal A2 is not instantly interrupted instantly because the head 2 is not skipped to the adjacent track. The time for the head 2 to skip to the adjacent track is usually sufficiently longer than the period of the reproduced signal A2. Therefore, in an off—track condition, the amplitude of the dark part side of the reproduced signal is lowered as shown in FIG. 8 (a). In sections $T_1$, $T_3$ the head 2 is scanning on an information track, and in section $T_2$ the head 2 is scanning between tracks.

In FIG. 8 (a), the broken line $\alpha$ denotes the threshold of the first waveform shaping circuit 101, and the broken line $\beta$ indicates the threshold of the second waveform shaping circuit 102. By thus offsetting the threshold of the second waveform shaping circuit 102 to the dark part side of the reproduced signal A2, the first rectangular waveform signal B2 from the first waveform shaping circuit 101 disappears faster than the second rectangular waveform signal C2 from the second waveform shaping circuit 102.

Figure 8B:
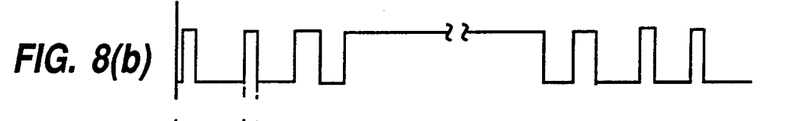
Figure 8C:
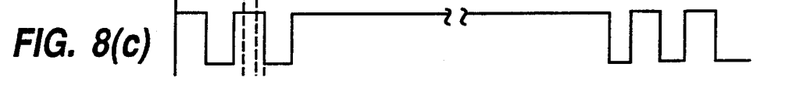
Figure 8D:
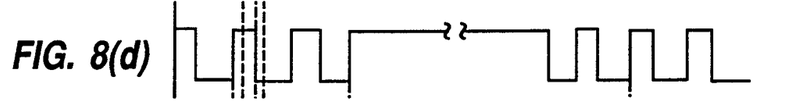
Figure 8E:
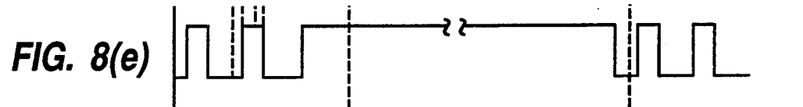

The first rectangular wave signal B2 shown in FIG. 8 (b) and the second rectangular wave signal C2 shown in FIG. 8 (c) always change between logic "0" and logic "1". Designating the logic state of the two the two signals B2 and C2 as (logic state of B2, logic state of C2) the following transition of the logic state of the two signals B2 and C2 is repeated in sections $T_1$ and $T_2$.

$$(0, 0) \rightleftarrows (0, 1) \rightleftarrows (1, 1) \tag{10}$$

In section $T_2$ (off the track): the transition is as follows.

$$(0, 1) \rightleftarrows (1, 1) \tag{11}$$

These first and second rectangular wave signals B2 and C2 are supplied to the pulse conversion circuit 103, where they are converted into pulse signals E2 and D2 which have overlapping waveforms where the first rectangular wave signal B2 has a logic "1".

The logic formulae of the output signals D2 and E2 of the pulse conversion circuit 103 are given as follows:

$$D2 = \overline{E2} \cdot C2 + B2 \tag{12}$$

$$E2 = E2' \cdot C2 + B2 \tag{13}$$

where E2' denotes the logic value of the signal E2 at a time one bit time before, and $\overline{E2}$ is the inverted logic of E2.

From formula (13), the output signal E2 has, in sections $T_1$ and $T_3$, logic "1" in the period from a rising of the signal B2 to logic "1" to a falling of the signal C2 to logic "0", while in section $T_2$ it is always "0" because the signal C2 is always logic "0". Meanwhile, the output signal D2 becomes logic "1", in sections $T_1$, $T_3$, from a rising of the signal C2 to logic "1" to a falling of the signal B2 to logic "0", and in section $T_2$, since the output signal E2 is logic "0", the signal C2 appears as the output signal D2. The transition of the input signals B2, C2 of the pulse conversion circuit 103 is as shown in formula (11), so that the output signal of the NAND gate circuit 603 is exactly an inverted version of the logic of the output signal E2. Therefore, the logic of $\overline{E2}$ can be obtained at the output of the NAND gate circuit 603 That is, using the circuit configuration as shown in FIG. 6, the pulse signals D2 and E2, which overlap where the first rectangular wave signal B2 is logic "1", are obtained from the first and second rectangular wave signals B2 and C2.

Accordingly, the state transition of the logic state of the pulse signals D2 and E2, expressed as (logic state of D2, logic state of E2), repeats a pattern of $$\rightarrow (0, 0) \rightarrow (1, 0) \rightarrow (1, 1) \rightarrow (0, 1) \rightarrow \tag{14}$$

in sections $T_1$ and $T_3$, and of $$(0, 1) \rightleftarrows (1, 1) \tag{15}$$

in section $T_2$

Therefore, by detecting the transition of changing from (1, 1) to (1, 0) by the state transition discrimination circuit 104, the level deviation of the reproduced signal A2, due to an off-track state of the head 2, can be detected.

Figure 8F:
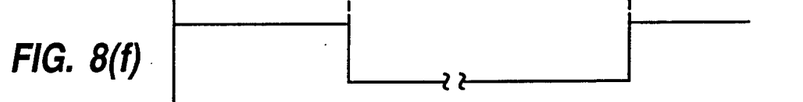
Figure 8G:
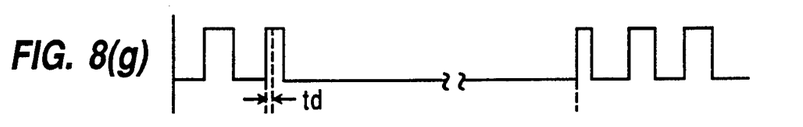
Figure 8H:
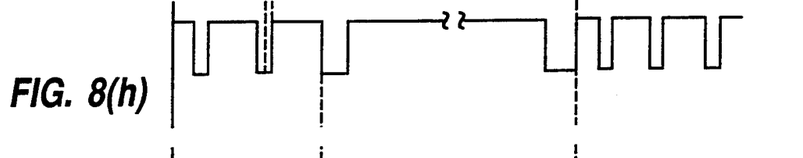
Figure 8I:
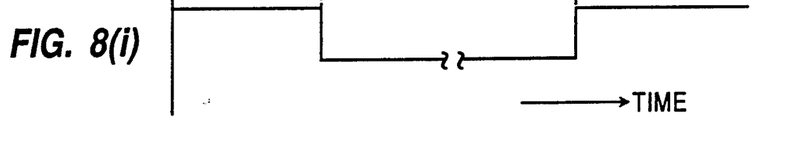

That is, the output signals D2 and E2 of the pulse conversion circuit 103 are supplied to the D-flip-flop 606 in the state transition discrimination circuit 104 In the D-flip-flop 606, a logic value applied to an input terminal Da appears at an output terminal Q when a leading edge is fed to a clock input terminal CK. Therefore, by feeding the signal D2 to the clock terminal CK of the D-flip-flop 606, and supplying the signal E2 to the input terminal Da, the output signal F2 has logic "1" in sections $T_1$, $T_3$, and logic "0" in section $T_2$, as shown in FIG. 8 (f).

In this way, the pulse conversion circuit 103 and the state transition discrimination circuit 104 are composed to operate in asynchronous logic. The only time element in generating the logic state is the gate delay of the gate circuits, and the embodiment is not affected by to the period of the reproduced signal A2. Therefore, if the rotational speed of the disk 1 is slow, the deviation of the reproduced signal, due to an off-track state of the head 2, can be detected reliably as a signal level deviation detected signal.

Figure 7:
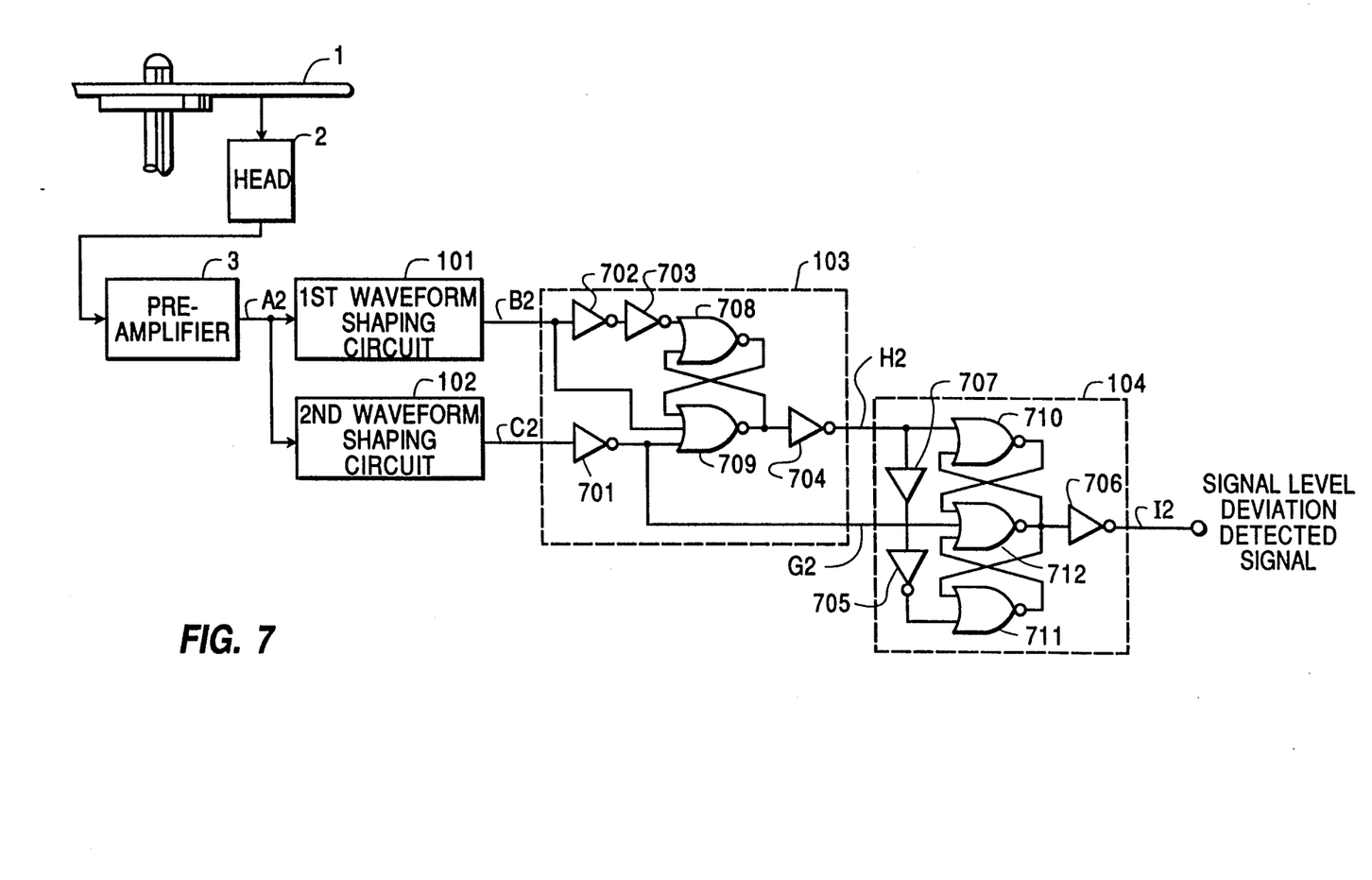
FIG. 7 is a block diagram of a signal level deviation detecting apparatus according to a fourth embodiment of this invention.

FIG. 7 is a fourth embodiment of this invention, in which a circuit composed of inverters 701, 702, 703, 704, and NOR gate circuits 708, 709 is used as a pulse conversion circuit 103. A state transition discrimination circuit 104 comprises inverters 705, 706, a buffer 707, and NOR gate circuits 710, 711, 712. FIG. 8 (a) to FIG. 8 (c) and FIG. 8 (h) to FIG. 8 (i) are signal waveform diagrams of this embodiment, which respectively correspond to signals A2, B2, C2, G2, H2 and I2 in FIG. 7.

The logical formulae of the output signals G2 and H2 of the pulse conversion circuit 103, shown in FIG. 7, are given as follows.

$$G2 = \overline{C2} \tag{16}$$

$$H2 = \overline{\overline{B2} \cdot C2 \cdot (B2' + H2')} \tag{17}$$

The logical formula of the output signal I2 of the state transition discrimination circuit 104 is given as follows.

$$I2 = \overline{\overline{G2} \cdot (H2 + I2') \cdot (H2' + I2')} \tag{18}$$

Where, B2', H2' and I2' are respectively the logic, values of B2, H2 and I2 at a time one bit before, and each bar indicates an inverted logic value.

In FIG. 7, the inverters 702, 703 are gates delay, and are used to obtain the information of signal B2 one bit time before From formula (17), the output signal H2 of the pulse conversion circuit 103 changes from logic "1" to logic "0" only when the input signal C2 is logic "1" and the input signal B2 changes from logic "1" to logic "0". That is, in sections $T_1$, $T_3$, the second pulse signal H2 has logic "0" in the period from a falling of the first rectangular wave signal B2 from logic "1" to logic "0" to a falling of the second rectangular wave signal C2 from,. logic "1" to logic "0". Otherwise, H2 has a logic "1". Comparing the first pulse signal G2 and the second pulse signal H2, it is known that the second pulse signal H2 contains a gate delay td due to the inverter 704 and NOR gate circuit 709

Therefore, the state transition of the first pulse signal G2 and second pulse signal H2 causes, when the logic state of the both is expressed as (G2, H2), a circulation pattern of the state transition as indicated by formula (14) in sections $T_1$, $T_3$. In section $T_2$ and the logic state is inverted as shown in formula (15).

The buffer 707 in the state transition discrimination circuit 104 is a delay. From formula (18), the output signal I2 is logic "1" only when the input signal G2 is logic "0" and the input signal H2 changes from logic "0" to logic "1", and it does not become logic "1" until the input signal G2 becomes logic "1" again Hence, the signal waveform as shown in FIG. 5 (i) appears as the output signal I2 of the state transition discrimination circuit 104. In this way, the pulse conversion circuit 103 and the state transition discrimination circuit 104 are composed to. operate in asynchronous logic. The only time element in generating the logic state is the gate time of the NOR gate circuits, buffer and inverter, and the embodiment is not affected by the period of the reproduced signal A2. Therefore, regardless of the rotational speed of the disk 1, the level deviation of the reproduced signal, due to off-track state of the head 2, can be detected reliably as a signal level deviation detected signal.

Figure 9:
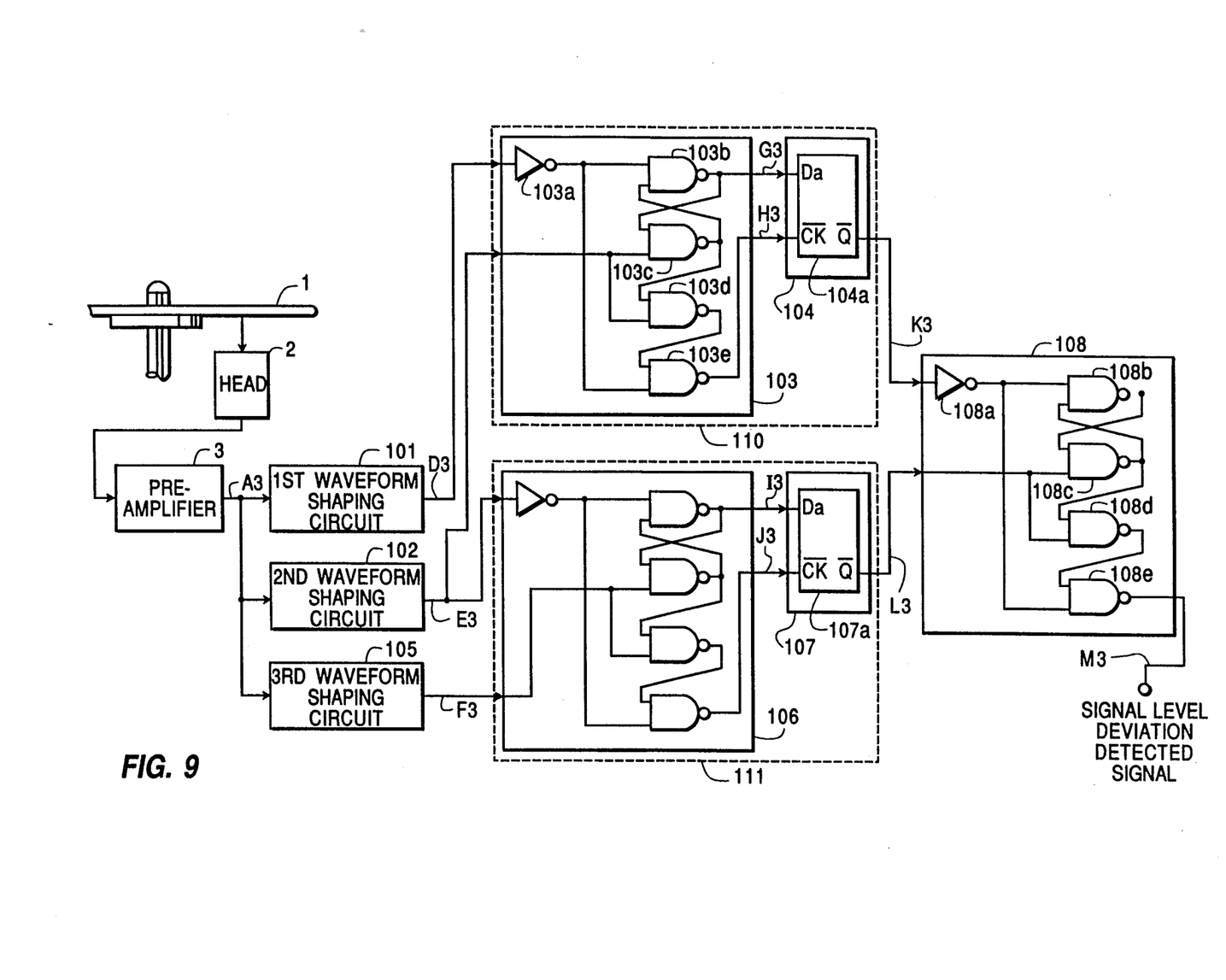
FIG. 9 is a block diagram of a signal level deviation detecting apparatus according to a fifth embodiment of this invention.

FIG. 9 is a block diagram showing a fifth embodiment of a signal level deviation detecting apparatus of this invention, in which the disk 1, head 2 and amplifier 3 are same as those in FIG. 1 and are not therefore specifically described herein. On the embodiment of FIG. 9 there is a first waveforms shaping circuit 101, a second waveform shaping circuit 102, and a third waveform shaping circuit 105, which convert the reproduced signal into rectangular wave signals at different thresholds. A first pulse conversion circuit 103 is composed of an inverter 103a, and NAND gate circuits 103b, 103c, 103d, 103e. A second pulse conversion circuit 106 is not described in detail in this drawing because the circuit configuration is same as that of the first pulse conversion circuit 103. A first state transition discrimination circuit 104 and a second state transition discrimination circuit 107 are respectively composed of edge triggered D-flip-flop circuits 104a and 107a. A logical synthesis circuit 108 is composed of an inverter 108a, and NAND gate circuits 108b, 108c, 108d, 108e. Numeral 110 shows a signal dropout detecting circuit, which is composed of the first pulse conversion circuit 103 and the first state transition discrimination circuit 104. Numeral 111 shows a second signal dropout detecting circuit, which is composed of the second pulse conversion circuit 106 and the second state transition discrimination circuit 107.

The operation of the signal level deviation detecting apparatus shown in FIG. 9 will be described herein by referring through the signal waveform diagrams in FIG. 10 (a) to FIG. 10 (j) which correspond respectively to signals A3, D3, E3, F3, G3, H3, I3, J3, K3, L3 and M3 in FIG. 9. The reproduced signal A3 read out from the disk 1 is actually nearly sinusoidal, but it is schematically expressed as triangular wave for simplicity.

Below is described a case where the light beam of the head 2 is interrupted due to a contamination on the disk surface, as in the case described in connection with the first embodiment in FIG. 1.

The reproduced signal A3 is as shown in FIG. 11 (a). Here, $T_1$ and $T_3$ show sections in which the reproduced signal is in a normal state, and $T_2$ represents a section in which the reproduced signal is reduced due to the contaminated part of the disk.

Figures 10A, 10K:
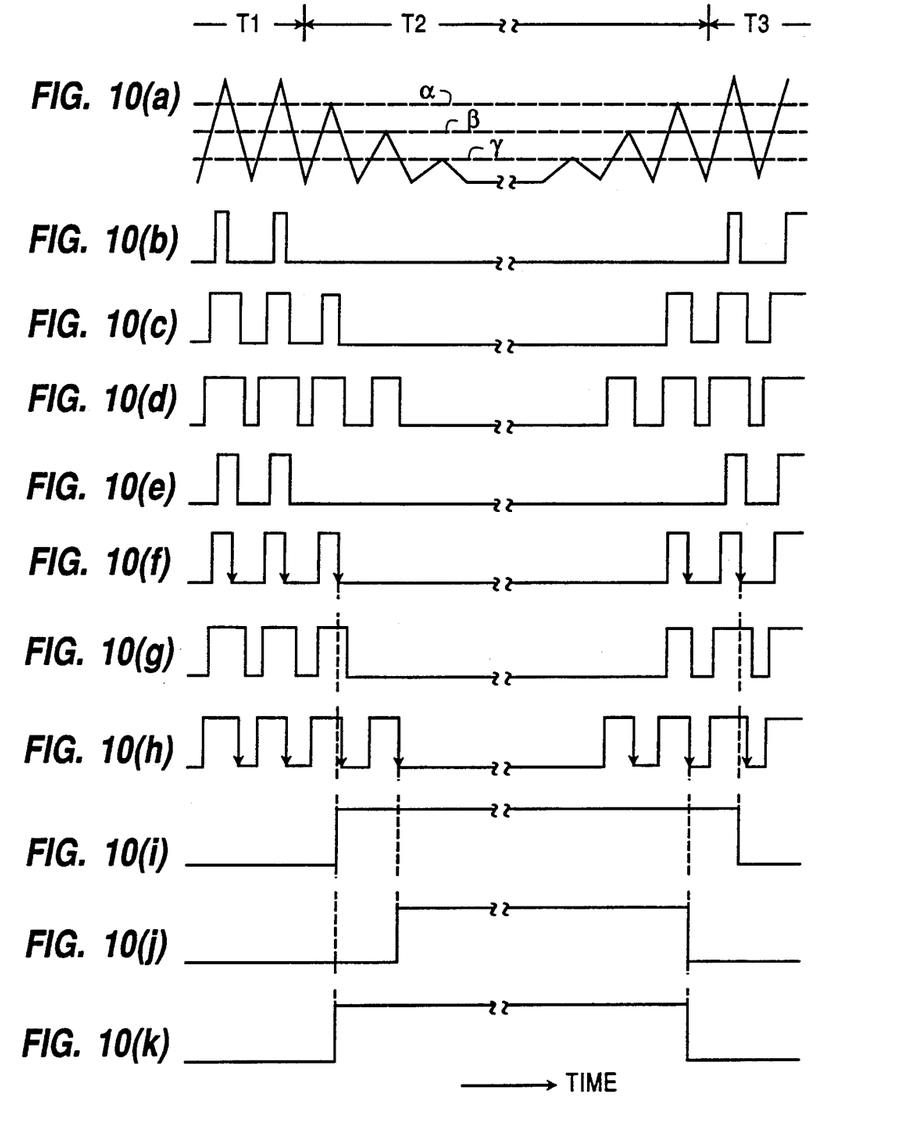

In FIG. 10 (a), the broken line $\alpha$ denotes a threshold of the first waveform shaping circuit 101, the broken line indicates a threshold of the second waveform shaping circuit 102, and the broken line $\gamma$ represents a threshold of the third waveform shaping circuit 105. The first waveform shaping circuit 101, the second waveform shaping circuit 102, and the third waveform shaping circuit 105 are delivering output signals D3, E3 and F3 as respectively shown in FIGS. 10 (b), (c) and (d), which are always changing between logic "0" and logic "1".

Expressing the logic state of the signals D3 and E3 as the following transition of the logic state of the signals D3 and E3 is repeated in sections $T_1$ and $T_3$.

$$(0, 0) \rightleftarrows (0, 1) \rightleftarrows (1, 1) \tag{19}$$

In section $T_2$ (where disk 1 is contaminated), the transition is as follows:

$$(0, 0) \rightleftarrows (0, 1)$$

Similarly, expressing the logic state of the signals E3 and F3 as (logic state of E3, logic state of F3) (E3, F3), the formula (19) is established in sections $T_1$ and $T_3$ and in a part of section $T_2$, while the formula (20) is established in the other part of section $T_2$.

Meanwhile, the logic formulae of the output signals G3 and H3 of the first pulse conversion circuit 103 are given as $$G3 = G3' \cdot E3 + D3 \quad (21)$$

$$H3 = \overline{G3} \cdot E3 + D3 \quad (22)$$

where G3' denotes the logic value of G3 at a time one bit time before, and $\overline{G3}$ indicates the inverted logic of G3.

From formula (21), the output signal G3 has, in sections $T_1$ and $T_3$, logic "1" in the period from a rising of the signal D3 to logic "1" to a falling of the signal E3 to logic "0", while in section $T_2$, it is always "0" because the signal D3 is always logic "0". On the other hand, the output signal H3 has logic "1", in sections $T_1$ and $T_2$, in the period from a rise of the signal E3 to logic "1" to a fall of the signal D3 to logic "0", and in section $T_2$, since the output signal G3 is logic "0", the input signal E3 appears directly as the output signal H3. Meanwhile, since the transition of the signals D3 and E3 is as shown in formula (19), (20), the output signal of the NAND gate circuit 103c is just an inverted logic of the output signal G3 Therefore, the logic of being $\overline{G3}$ can be obtained at the output of the NAND gate circuit 103c. Accordingly, using the circuit configuration as shown in the first pulse conversion circuit 103, the signals G3 and H3 as shown in FIG. 10 (g) and FIG. 10 (h) which are overlapped when the logic of the signal E3 as shown in FIG. 10 (c) is "1" can be obtained from the signals D3 and E3 as shown in FIG. 10, (b), and FIG. 10 (c). Therefore, the state transition of the logic state of the signals G3 and H3, expressed as (logic state of G3, logic state of H3), is to repeat a circulation pattern of $$\rightarrow (0, 0) \rightarrow (1, 0) \rightarrow (1, 1) \rightarrow (0, 1) \rightarrow \quad (23)$$

in sections $T_1$ and $T_2$, and repeat a circulation pattern of $$(0, 0) \rightleftarrows (0, 1) \quad (24)$$

in section $T_2$, so that an inverted state transition can be created with respect to the circulation pattern of formula (23) from (0, 1) to (0, 0).

The output signals G3 and H3 of the first pulse conversion circuit 103 thus obtained are supplied to the D-flip-flop 104a which makes up the first state transition discrimination circuit 104.

In the D-flip-flop 104a, a logic value, which is an inverted value of a logic value applied to an input terminal Da where a trailing edge is fed to a clock input terminal $\overline{CK}$ appears at an output terminal Q. Therefore, by feeding the signal H3 to the clock input terminal $\overline{CK}$ of and the signal to the input terminal Da, the output signal K3 is logic "0" in sections $T_1$, $T_3$, and logic "1" in section $T_2$ as shown in FIG. 10 (i).

Since the second pulse conversion circuit 102 and the second state transition discrimination circuit. 107 are identical in circuit configuration to the first pulse conversion circuit 103 and the first state transition discrimination circuit 104, respectively, and the state transition of the input signals E3 and F3 of the second pulse conversion circuit 106 is identical with that of input signals D3 and E3 of the first pulse conversion circuit 103, the repetitive descriptions are omitted The signals K3 and L3 are fed into the logical synthesis circuit 108, and synthesized as the output signal M3. The circuit configuration of the logical synthesis circuit 108 can be the same configuration as that of the first pulse conversion circuit 103 by using an inverter 108a and NAND gates 108b–108e as shown in FIG. 9. That is, the signal M3 becomes logic "1" when the signal K3 rises from logic "0" to logic "1", and returns to logic "0" when the signal L3 falls from logic "1" to logic "0". As a result, the output signal M3 of the logical synthesis circuit 108 precisely detects the defective section $T_2$ as shown in FIG. 10 (k). That is, the signal K3 is inverted from logic "0" to logic "1" almost simultaneously when entering section $T_2$, and returns to logic "0" after passing through section $T_2$. The inverting time of the signal L3 from logic "0" to logic "1" in section $T_2$ is slower than that of the signal K3, but it does not enter into section $T_3$ before returning to logic "0". Thus, only the advantages of the signal K3 and signal L3 are picked up in the logical synthesis circuit 108.

In this way, the first pulse conversion circuit 103, the second pulse conversion circuit 106, the first state transition discrimination circuit 104, the second state transition discrimination circuit 107, and the logical synthesis circuit 108 are all composed to operate in synchronous logic. The only time element in generating the logical states is the gate delay time of the gate circuits and the embodiment is not affected by the period of the reproduced signal A3. Therefore, if the rotational speed of the disk 1 is slow, the level of deviation of the reproduced signal due to a defect on the disk 1 can be detected reliably as a signal level deviation detected signal.

Thus, according to this invention, any defective position on a disk can be correctly detected regardless of the rotational frequency of the disk. Furthermore, because of composition in asynchronous logic circuit, capacitors and other passive parts are not required, so that it is easy to fabricate at a lower cost and to reduce the size.

In the above embodiments the detection of level deviation of the reproduced signal from an optical disk has been mentioned, but these embodiments may be similarly applied to a detection of level deviation of any signal obtained in any apparatus. Therefore, this invention is not limited to the embodiments herein, and other various modifications and changes are possible within the spirit of this invention.

What is claimed is:

1. A signal level deviation detecting apparatus comprising:
    at least two waveform shaping means having different threshold values for converting an input alternating signal into at least two rectangular waveform signals;
    a pulse conversion means for converting said rectangular waveform signals into at least two pulses signal logic states, wherein said logic states change in a first specific repeating pattern when said input alternating signal maintains a normal amplitude, and wherein said logic states change in a second specific repeating pattern when said alternating signal maintains an amplitude below one of said threshold values; and a state transition discrimination means, which receives said at least two pulse signal logic states, for inverting an output logic state in response to a change from said first specific repeating pattern to said second specific repeating pattern or from said second specific repeating pattern to said first specific repeating pattern, wherein said output logic state is a signal level deviation detected signal indicative of a deviation in said amplitude of said input alternating signal.

2. The apparatus according to claim 1, wherein said input alternating signal is a signal reproduced from an optical information recording medium.

3. A signal level deviation detecting apparatus comprising:

a first and second waveform shaping means having different threshold values for converting an input alternating signal into first and second rectangular waveform signals;

a pulse conversion means for converting said first and second rectangular waveform signals into first and second pulse signal logic states;

wherein said logic states change in a first specific repeating pattern when said input alternating signal maintains a normal amplitude, and wherein said logic states change in a second specific repeating pattern when said alternating signal maintains an amplitude below one of said threshold values; and a state transition discrimination means, which receives said first and second pulse signal logic states, for inverting an output logic state in response to a change from said first specific repeating pattern to said second specific repeating pattern or from said second specific repeating pattern to said first specific repeating pattern, wherein said output state is a signal level deviation detected signal indicative of a deviation in said amplitude of said input alternating signal.

4. The apparatus according to claim 3, wherein said pulse conversion means is configured so that said first pulse signal logic state rises in response to each rising transition of said first rectangular waveform signal and falls in response to each falling transition of said second rectangular waveform signal, and said second pulse signal logic state "1" when said first waveform signal is logic "1" or when said second rectangular waveform signal is logic "1" and said first pulse signal logic state is logic "0", wherein a high level is designated logic "1", and a low level is designated logic "0".

5. The apparatus according to claim 4, wherein said state transition discrimination means comprises a D-flip-flop which receives said first pulse signal logic state at its D input terminal and said second pulse signal logic state at its clock input terminal to thereby obtain said signal level deviation detected signal at its output terminal.

6. The apparatus according to claim 3, wherein said pulse conversion means is configured so that said first pulse signal logic state rises in response to each rising transition of said first rectangular waveform signal and falls in response to each falling transition of said rectangular waveform signal, and said second pulse signal logic state is identical in rising and falling of transitions as said second rectangular waveform signal, and wherein said state transition discrimination means is configured so that its output logic state is logic "0" when said first pulse signal logic state is logic "0" and said second pulse signal logic state falls to logic "0", and becomes logic "1" when said first pulse signal logic state rises to logic "1", wherein high level is designated logic "1" and a low level is designated logic "0".

7. The apparatus according to claim 3, wherein said pulse conversion means is configured so that said first pulse signal logic state falls in response to each falling transition of said first rectangular waveform signal and rises in response either to each falling transition of said second rectangular waveform signal or to each rising transition of said first rectangular waveform signal, and said second pulse signal logic state is identical in rising and falling transitions as an inverse signal of said second rectangular waveform signal, and wherein said state transition discrimination means is configured so that its output logic state becomes "0" when said second pulse signal logic state is "0" and said first pulse signal logic state falls to logic "0", and becomes "1" when said second pulse signal logic state rises to logic "1", wherein a high level is designated logic "1" and a low level is designated logic "0".

8. An apparatus according to claim 3, wherein said input alternating signal is a signal reproduced from an optical information recording medium.

9. A signal level deviation detecting apparatus comprising:

first, second, and third waveform shaping means having different threshold values for converting an input alternating signal into first, second and third rectangular waveform signals respectively;

a first pulse conversion means for converting said first and second rectangular waveform signals into first and second pulse signal logic states, wherein said first and second logic states change in a first specific repeating pattern when said input alternating signal maintains a normal amplitude, and wherein said first and second logic states change in a second specific repeating pattern when said input alternating signal maintains an amplitude below a threshold of said first and second waveform shaping means;

a first state transition discriminating means, which receives said first and second pulse signal logic states, for inverting an output logic state in response to a change from said first specific repeating pattern to said second specific repeating pattern or from said second specific repeating pattern to said first specific repeating pattern;

a second pulse conversion means for converting said second and third rectangular waveform signals into third and fourth pulse signal logic states respectively, wherein said third and fourth logic states change in a third specific repeating pattern when said input alternating signal maintains a normal amplitude, and wherein said third and fourth logic states change in a fourth specific repeating pattern when said input alternating signal maintains an amplitude below a threshold of said second or third waveform shaping means;

a second state transition discriminating means, which receives said third and fourth pulse signal logic states, for inverting an output logic state in response to a change from said third specific repeating pattern to said fourth specific repeating pattern or from said fourth specific repeating pattern to said third specific repeating pattern;

a logic synthesizing means for inverting an output logic state in response to each rising transition of said output logic state of said first state transition discriminating means and in response to each falling transition of said output logic state of said second state transition discrimination means, thereby producing a signal level deviation detected a signal indicative of an amplitude deviation of said input signal.

10. The apparatus according to claim 9, wherein said input alternating signal is a signal reproduced from an optical information recording medium.

* * * * *